United States Patent [19]

Davis

[11] Patent Number: 4,868,561
[45] Date of Patent: Sep. 19, 1989

[54] METHOD OF REPROGRAMMING AN ALERT PATTERN

[75] Inventor: Walter L. Davis, Coral Springs, Fla.

[73] Assignee: Motorola, Inc., Schaumburg, Ill.

[21] Appl. No.: 219,687

[22] Filed: Jul. 1, 1988

[51] Int. Cl.$^4$ .................. H04M 11/04; H04Q 7/00
[52] U.S. Cl. ..................... 340/825.44; 340/825.48; 340/311.1; 379/57
[58] Field of Search .......... 340/825.44, 384 R, 384 E, 340/311.1, 825.48; 379/57

[56] References Cited

U.S. PATENT DOCUMENTS

| | | | |
|---|---|---|---|
| 4,477,807 | 10/1984 | Nakajima et al. | 340/825.48 |
| 4,682,165 | 7/1987 | Davis | 340/825.44 |
| 4,701,759 | 10/1987 | Nadir et al. | 340/825.48 |
| 4,802,200 | 1/1989 | Murata et al. | 379/57 |
| 4,811,379 | 3/1989 | Grandfield | 340/825.44 |

*Primary Examiner*—Donald J. Yusko
*Assistant Examiner*—Brian Palladino
*Attorney, Agent, or Firm*—Michael J. DeLuca; Vincent B. Ingrassia

[57] ABSTRACT

A method of selecting an alert pattern for a pager receiver including calling the pager terminal on a telephone, providing a unit ID, a pattern select coded signal and identifying a new alert pattern. The pager terminal then transmits a "replace alert pattern signal", which prepares a reprogrammable memory in the pager receiver for reprogramming, and the selected new alert pattern, which is then programmed into the alert pattern memory.

7 Claims, 3 Drawing Sheets

13

METHOD OF REPROGRAMMING AN ALERT PATTERN

BACKGROUND OF THE INVENTION

This invention pertains to communication systems in which some type of indicator, generally referred to as an alert signal, is utilized to notify a receiving apparatus and/or operator that a signal is being transmitted and more specifically to paging systems and the like wherein an alert signal is transmitted to a pager as notification of a page.

In general, communication systems utilize audio signals or visual displays to alert receiver equipment and/or operators that a signal has been or is being transmitted. In some instances, such as paging systems, the alert signal may be the paging signal. Further, in some instances communication systems may be utilized which do not involve a human operator and the alert signal is neither audio nor visual but is simply a coded signal that is intended to alert the receiving device or cause the receiving device to perform a predetermined function. In all of these instances it is sometimes desirable to modify the alert pattern or signal. For example, in a paging system wherein the remote pagers use audible alert signals several remote pagers may have the same alert audible signal. If several of the pager users are in the same room when the page is transmitted it is generally confusing to determine which of the several users is being paged. By providing each of the remote pagers with a different audible alert signal, each of the pager users will instantly know whether an alert signal is from his pager.

Because each paging system may include a large number of remote pagers, providing each pager with a unique alert signal would cause an extremely difficult manufacturing problem. Further, if the pagers were constructed so that the alert signals could be modified only by either the manufacturer or a local distributer it would be inconvenient for the pager owner to have the alert signal modified each time that the alert signal coincided with the alert signal of a pager in his area.

SUMMARY OF THE INVENTION

It is an object of the present invention to provide a new and improved method for reprogramming alert patterns in remote receivers of a communications system.

It is a further object of the present invention to provide a new and improved method of reprogramming alert patterns which does not require the owner of a remote receiver to open the receiver or return the unit to the manufacturer.

It is a further object of the present invention to provide a new and improved method for reprogramming alert patterns of remote receivers quickly and easily so that conflicts between alert signals, such as audible alert signals, can be substantially eliminated.

These and other objects of this invention are specifically embodied in a communications system including a transmitter and at least one remote receiver having a reprogrammable alert pattern memory and wherein the method of selecting an alert pattern includes the steps of communicating with the transmitter by identifying the remote receiver, confirming a desire to reprogram the alert pattern memory of the identified remote receiver, and identifying a selected alert pattern from a list of possible predetermined alert patterns; transmitting to the remote receiver with the transsmitter, by using the provided unit identification and in response to the confirmation of a desire to reprogram the alert program memory, a replace alert pattern signal; receiving the replace alert pattern signal at the remote receiver and preparing the alert pattern memory to be reprogrammed; transmitting the selected alert pattern to the remote receiver; and receiving the transmitted alert pattern at the remote receiver and reprogramming the alert pattern memory of the remote receiver with the received alert pattern.

DESCRIPTION OF THE PREFERRED EMBODIMENT

Figure 1:
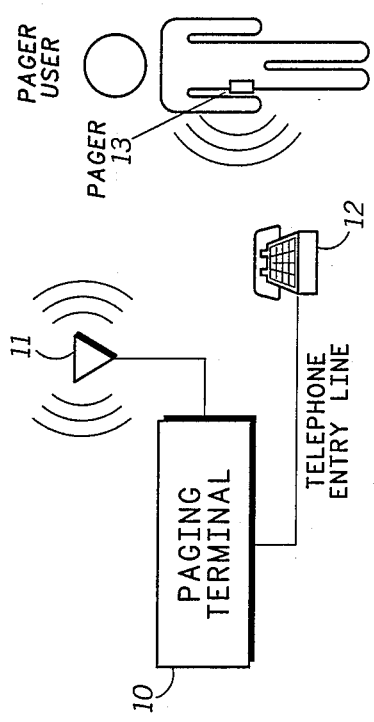
FIG. 1 is a block diagram of a paging system.

Referring specifically to FIG. 1, a paging system is illustrated including a paging terminal 10 having at least a transmitter coupled to an antenna 11. Paging terminal 10 is coupled to a telephone 12 by which a user of a pager 13 can contact paging terminal 10 and initiate or answer the pages. It should be understood by those skilled in the art that the paging system illustrated in FIG. 1 is for example only, and the present invention may be utilized on a variety of different communication systems including systems wherein a transmitter communicates with and operates remotely located devices. Further, it should be understood that the paging system illustrated utilizes audible alert signals but the present novel method would operate as well with a display paging system.

Figure 2:
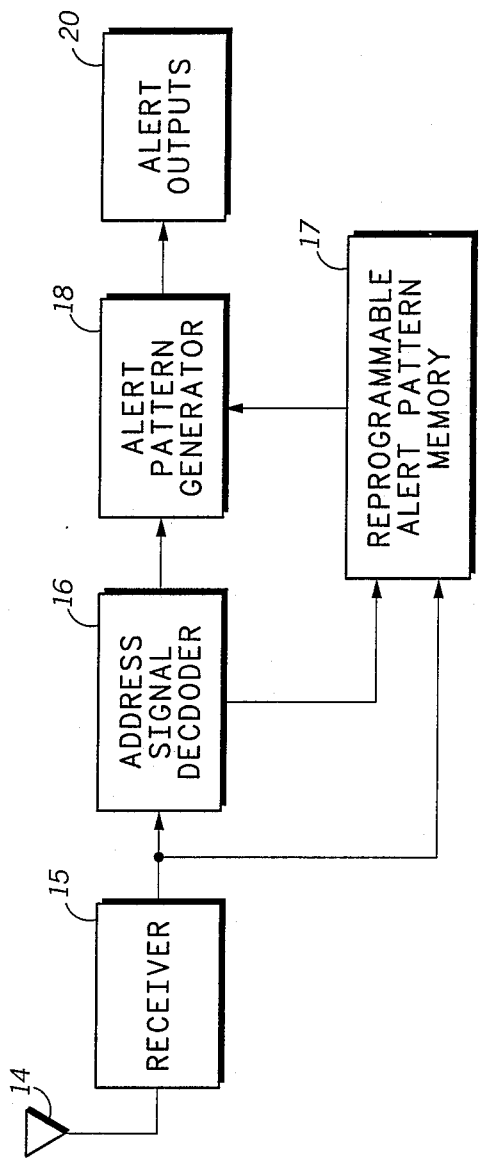
FIG. 2 is a simplified block diagram of the pager illustrated in FIG. 1.

Referring specifically to FIG. 2, a simplified block diagram of pager 13 is illustrated. Pager 13 includes an antenna 14 with a receiver 15 coupled thereto. Paging signals transmitted from paging terminal 10 and received by receiver 15 include an address signal and at least an alert signal. Pager 13 further includes an address signal decoder 16 coupled to the output of receiver 15 and a reprogrammable alert pattern memory 17 coupled to the output of receiver 15 and also coupled to address signal decoder 16 for receiving an enable signal therefrom when the address decoded corresponds to the address of pager 13. Address signal decoder 16 also supplies an enable signal to an alert pattern generator 18, which also receives an alert pattern signal from reprogrammable alert pattern memory 17. An output of alert pattern generator 18 is supplied to alert outputs 20 which may include an audio transducer and/or a visual display.

In the operation of the paging system, including remote pager 13, as an embodiment of the present invention, the operator of pager 13 is provided a list of possible predetermined alert patterns. These may include a variety of different tones or combinations of tones as well as a variety of songs each of which is identified by a specific identity code, such as numeric, alphabetic, alpha-numeric, etc. The pager operator selects which pattern or patterns he wishes to use in his pager form the provided list and by way of telephone 12 communicates with paging terminal 10. It will of course be understood that telephone 12 is the most convenient and efficient manner of communicating with paging terminal 10 but other means might be utilized, such as two way radios, direct communication, etc. In general, assuming the operator uses telephone 12 to access paging terminal 10, he enters the unit ID of pager 13, a coded signal that indicates that he wants to select a new alert pattern, and the identity code that identifies the desired alert patterns from the provided list of patterns. In some instances paging terminal 10 may be automated so that the identity code automatically selects the desired alert patterns from a library of alert patterns that have been coded into the system. The system then pages or signals pager 13 with a replace alert pattern signal which is a special signal that prepares the contents of alert pattern memory 17 for reprogramming. Terminal 10 then transmits the new alert patterns to be placed in alert pattern memory 17. The general concept of a reprogrammable memory is described in more detail in a pending PCT Patent Application intitled "SYSTEM FOR OFF-THE-AIR REPROGRAMMING OF COMMUNICATION RECEIVERS", bearing Ser. No. PCT/US87/00004, filed Jan. 2, 1987.

Figure 3:
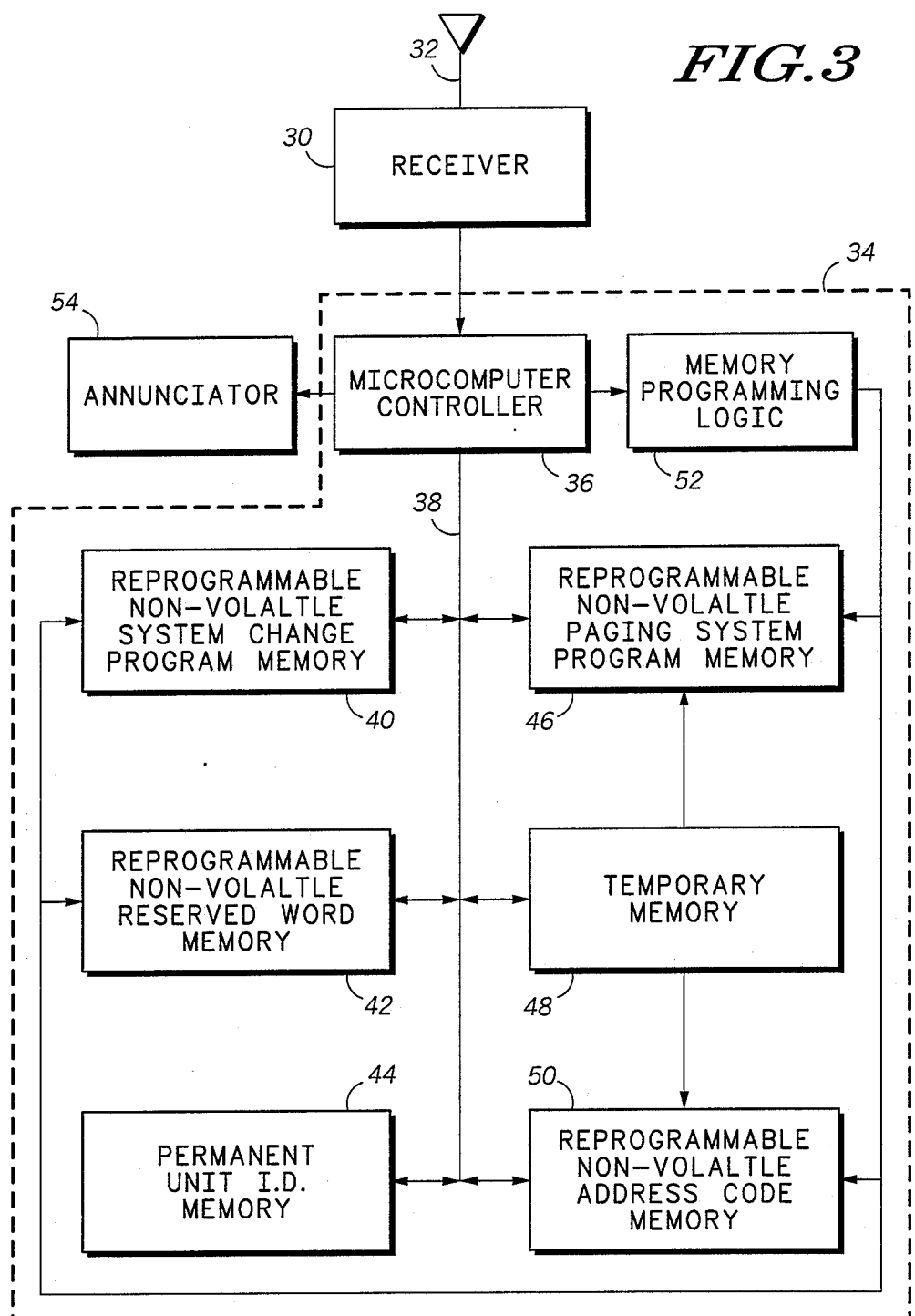
FIG. 3 is a functional block diagram of a reprogrammable pager.

Briefly, FIG. 3 illustrates a reprogrammable pager in functional block form which, as will be seen by those skilled in the art, includes all of the functions of the apparatus of FIG. 2 but is numbered differently to indicate that it is included simple to explain the reprogramming function. An antenna 30 is coupled to a receiver 32 the output of which is coupled to an analysis and decoding system block 34 shown enclosed by broken lines. Specifically, the output of receiver 32 is coupled to a microcomputer controller 36 which is in turn coupled through a bus line 38 to a reprogrammable non-volatile system change program memory 40, a reprogrammable non-volatile reserved word memory 42, a permanent receiver unit identification memory 44, a reprogrammable non-volatile paging system program memory 46, a temporary memory 48, and a reprogrammable non-volatile address code memory 50. Microcomputer 36 is also coupled to a memory programming logic element 52 containing programming control logic, which is in turn coupled to memories 40, 42, 46, and 50. In addition, microcomputer 36 is coupled to an annunciator 54 to generate an alerting sequence to inform the operator upon receipt of a message. The function of microcomputer 36 is to take the derived selective call message information from receiver 32 and process it according to a predetermined decoding format. In normal operation microcomputer 36 is responsive to the information contained in memory 46, and executes the signal decoding algorithms contained therein. Memory 46 contains all of the software information needed to allow microcomputer 36 to process and decode information encoded according to a predetermined signalling format. Memory 50 is used to store the address code sequences that uniquely identify a receiving device and information to designate its characteristics and features. Memory 42 is used to store address code sequences associated with a change in the address or options of the individual unit, or the signalling system.

In operation, microcomputer 36 acts to compare received signal sequences with the sequences stored in memories 50 and 42 to determine if the selective call code signal that addresses the individual unit have been received or if a system or unit change command has been received. When a selective call signal is detected, microcomputer 36 will respond in the normal manner according to the information contained in memory 50 to activate annunciator 54 and alert the pager operator that a message has been received.

When a change command signal (e.g. a replace alert pattern signal) is received, microcomputer 36 responds by storing the new data in temporary memory 48 and then transferring the data to the appropriate non-volatile memory. Memory programming logic device 52, under the control of microcomputer 36, is used for accessing memories 40, 42, 46, and 50 for the purpose of reprogramming them with data stored in temporary memory 48 after verifying that the stored data is complete. A permanent unit ID memory 44 is provided so that regardless of the status or utilization of any paging code format, the receiver always has an identifiable permanent address. Data that represents instructions for decoding a new signalling system are programmed into memory 46, data corresponding to new system change instructions is programmed into memory 40, and data corresponding to new reserved word signals is programmed into memory 42. A new address signal for the unit is derived from permanent unit ID memory 44 using an algorithm contained in transmitted data, and the new address signal is programmed into memory 50. If only the information in code memory 50 affecting the address features or options of the device are to be reprogrammed, an algorithm need not be transmitted. Rather the new information may be transmitted directly.

The reprogramming of the various non-volatile memories for the decoder is accomplished by means of memory programming logic 52. In particular, microcomputer 36 directs the memory programming logic to set up a specific memory for reprogramming and then sequentially inputs the data to the selected memory via bus 38. The memory programming logic acts to enable the programming mode of the particular memory, and further prepares the memory to receive new data into a specified region of the memory map. The precise details of programming a non-volatile memory device, such as an EEPROM memory as used in this embodiment, are well known in the art and are not presented here.

No specific message coding format has been disclosed herein for brevity and clarity. It is believed that such format is not essential to an understanding of the invention. However, it will be understood by those skilled in the art that a standard message coding format such as that commonly known as POCSAG can be utilized. For a complete description of the POCSAG message format and the operation of the reprogrammable pager in response to the message format refer to: The book entitled "A Standard Code for Radiopaging" published July of 1979 wherein the international name for POCSAG is "CCIR Radiopaging Code No. 1 (Rec. 584, Geneva, 1982, POCSAG-Code); U.S. Pat. No. 4,518,961, entitled "Universal Paging Device with Power Conservation", issued May 21, 1985; and FIGS. 3A–3E and the associated description from the above described copending application, all of which are incorporated herein by reference.

Figure 4:
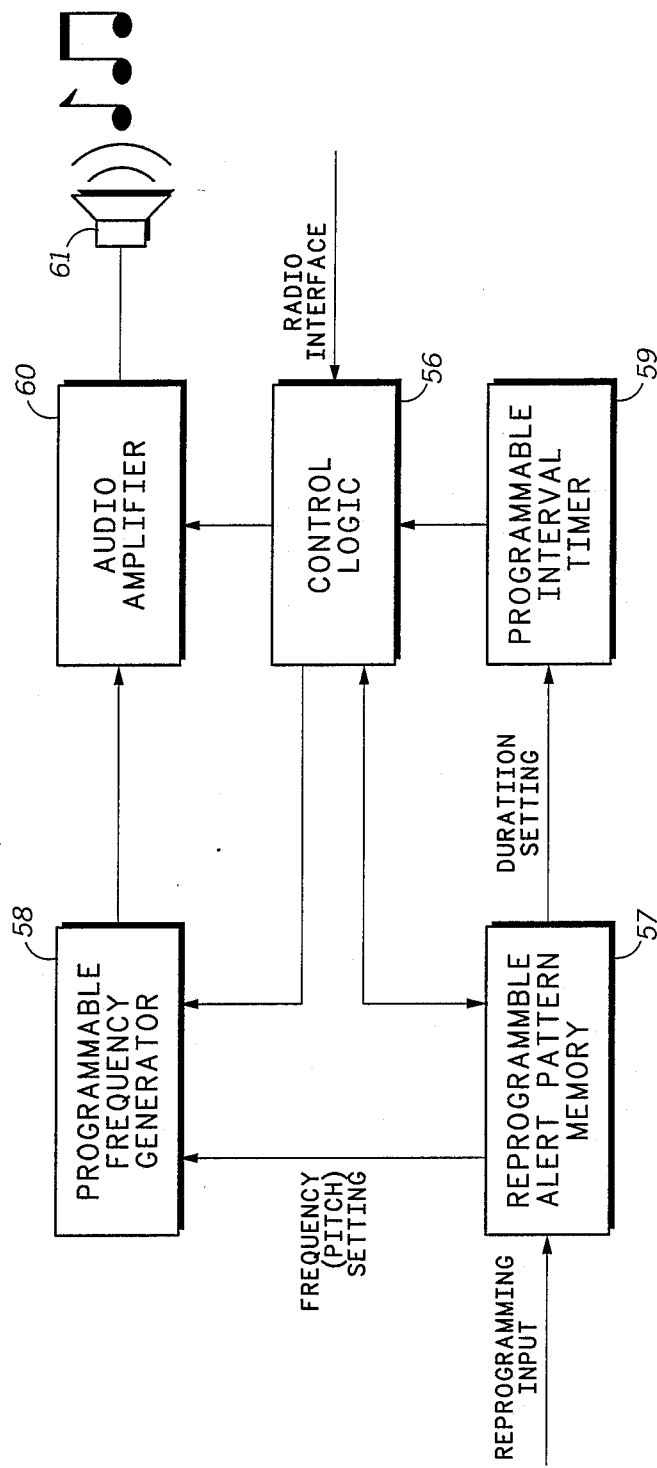
FIG. 4 is a more detailed block diagram of alert circuitry for generating programmable audio alert patterns.

Referring specifically to FIG. 4, a more detailed block diagram of alert circuitry for generating programmable alert patterns is illustrated. The alert circuitry includes control logic 56 connected to receive alert signals from a receiver and supply control signals to a reprogrammable alert pattern memory 57, a programmable frequency generator 58 and an audio amplifier 60. Reprogrammable alert pattern memory 57 supplies frequency (pitch) settings to programmable frequency generator 58 and duration settings to a programmable interval timer 59. Programmable interval timer 59 supplies duration control signals to control logic 56 and reprogrammable alert pattern memory 57 supplies control signals to control logic 56. Thus, frequency generator 58 is utilized to play musical notes in accordance with frequency and duration information contained in reprogrammable alert pattern memory 57. The musical notes are supplied through audio amplifier 60 to a speaker 61.

Reprogrammable alert pattern memory 57 has a reprogramming input connected to the receiver for reprogramming the alert patterns in accordance with the present invention. That is, the pager operator uses a list of possible predetermined alert patterns (in this case songs) to select which song or songs he wishes to use in his pager. The operator uses a telephone to access the paging system terminal, and enters his pager unit ID, a coded signal that indicates he wants to select a new alert pattern, and an identity code that identifies the desired song from the library of alert patterns that have been coded into the system. The system then pages or signals the operator's pager with a special signal that indicates the contents of reprogrammable alert pattern memory 57 are to be replaced, and then transmits the new information to be placed in memory 57. In the case of musical alerts, the alert data consists of the pitch and duration information needed to play the desired song or songs.

Thus, a new method of reprogramming an alert pattern in a remote receiver is disclosed, which method will provide a customer selectable alert patterns without requiring physical modification of the remote receiver. Further, the method does not complicate the manufacturing process in that the alert customization does not take place in the factory. Also, the present method allows the paging system operator to provide as many alert patterns as he wishes, and allows the paging system operator to offer customized service to his customers. While the present invention has been illustrated in conjunction with paging receivers, it should be understood that it could also be used in conjunction with cellular telephones, portable radios, and other selective signalling devices. It could also be used in the telephone receivers, cordless telephones and remote alarm systems.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a communications system including a transmitter and at least one remote receiver having a reprogrammable alert pattern memory, a method of selecting an alert pattern comprising the steps of:
   providing a list of possible predetermined alert patterns;
   communicating with the transmitter by identifying the remote receiver, confirming a desire to reprogram the alert pattern memory of the identified remote receiver, and identifying a selected alert pattern from the list;
   transmitting to the remote receiver with the transmitter, by using the provided unit identification and in response to the confirmation of a desire to reprogram the alert pattern memory, a replace alert pattern signal;
   receiving the replace alert pattern signal at the remote receiver and preparing the alert pattern memory to be reprogrammed;
   transmitting the selected alert pattern to the remote receiver; and
   receiving the transmitted alert pattern at the remote receiver and reprogramming the alert pattern memory of the remote receiver with the received alert pattern.

2. In a communications system including a transmitter and at least one remote receiver having a reprogrammable alert pattern memory, a method of selecting an alert pattern comprising the steps of:
   providing a list of possible predetermined alert patterns each pattern being identified by an identity code;
   communicating with the transmitter and providing the transmitter with a unit identification for the remote receiver, a pattern select coded signal, and an identity code identifying a selected alert pattern from the list;
   transmitting to the remote receiver, by using the provided unit identification and in response to the pattern select coded signal, a replace alert pattern signal;
   receiving the replace alert pattern signal at the remote receiver and preparing the alert pattern memory to be reprogrammed;
   transmitting the selected alert pattern to the remote receiver; and
   receiving the transmitted alert pattern at the remote receiver and reprogramming the alert pattern memory of the remote receiver with the received alert pattern.

3. In a paging system including a paging terminal with a transmitter, a telephone and at least one remote pager having a reprogrammable alert pattern memory, a method of selecting an alert pattern comprising the steps of:
   providing a list of possible alert patterns, each pattern being identified by an identity code;
   telephoning the paging terminal and providing the terminal with a unit identification for the remote pager, a pattern select coded signal, and an identity code identifying a selected alert pattern from the list;
   transmitting to the remote pager, by using the provided unit identification and in response to the pattern select coded signal, a replace alert pattern signal:
   receiving the replace alert pattern signal at the remote pager and preparing the alert pattern memory to be reprogrammed;
   transmitting the selected alert pattern to the remote pager; and
   receiving the transmitted alert pattern at the remote pager and reprogramming the alert pattern memory of the remote pager with the received alert pattern.

4. In a communications system including a transmitter and at least one remote receiver having a reprogrammable alert pattern memory, a method of reprogramming the remote receiver comprising the steps of:

providing a list of possible predetermined alert patterns;

communicating with the transmitter by identifying the remote receiver, confirming a desire to reprogram the alert pattern memory of the identified remote receiver, and identifying a selected alert pattern from the list;

receiving from the transmitter, in response to the communication therewith, a replace alert pattern signal structured to prepare the reprogrammable alert pattern memory for reprogramming; and receiving from the transmitter and automatically storing in the prepared reprogrammable alert pattern memory the selected alert pattern.

5. In a communications system including a transmitter and at least one remote receiver having a reprogrammable alert pattern memory, a method of reprogramming the remote receiver as claimed in claim 4 wherein the selected alert pattern includes music and receiving and storing the selected alert pattern includes receiving and storing pitch and duration information need to play the included music.

6. In a communications system including a transmitter and at least one remote receiver having a reprogrammable alert pattern memory, a method of reprogramming the remote receiver comprising the steps of:

providing a list of possible predetermined alert patterns;

receiving a communication identifying a remote receiver, confirming a desire to reprogram the alert pattern memory of the identified remote receiver, and identifying a selected alert pattern from the list;

transmitting, from the transmitter to the identified remote receiver, a replace alert pattern signal structured to prepare the alert pattern memory for reprogramming; and transmitting, from the transmitter to the identified remote receiver for automatic sorting in the prepared alert pattern memory, the selected alert pattern.

7. In a communications system including a transmitter and at least one remote receiver having a reprogrammable alert pattern memory, a method of reprogramming the remote receiver as claimed in claim 6 wherein the step of receiving a communication includes receiving a telephone message.

* * * * *